(12) United States Patent
Shim

(10) Patent No.: US 8,647,228 B2
(45) Date of Patent: Feb. 11, 2014

(54) GEAR TRAIN OF AUTOMATIC TRANSMISSION FOR VEHICLES

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 298 days.

(21) Appl. No.: 13/174,161

(22) Filed: Jun. 30, 2011

(65) Prior Publication Data

US 2012/0122625 A1 May 17, 2012

(30) Foreign Application Priority Data

Nov. 12, 2010 (KR) .................. 10-2010-0113007

(51) Int. Cl.
*F16H 3/62* (2006.01)
*F16H 3/44* (2006.01)
*F16H 37/06* (2006.01)

(52) U.S. Cl.
USPC ........... 475/276; 475/280; 475/281; 475/282; 475/283; 475/284; 475/285; 475/286; 475/287; 475/290; 475/291; 475/292; 475/330

(58) Field of Classification Search
USPC ............... 475/275–292, 311–313, 317–319, 475/323–325, 329, 330
See application file for complete search history.

(56) References Cited

U.S. PATENT DOCUMENTS

| | | | |
|---|---|---|---|
| 2007/0060439 A1* | 3/2007 | Kamada et al. | 475/284 |
| 2009/0298637 A1* | 12/2009 | Kim | 475/275 |
| 2009/0298639 A1* | 12/2009 | Kim | 475/275 |
| 2011/0245017 A1* | 10/2011 | Kim | 475/275 |
| 2012/0004068 A1* | 1/2012 | Park et al. | 475/284 |

FOREIGN PATENT DOCUMENTS

JP     2003-130152 A     5/2003

\* cited by examiner

*Primary Examiner* — Tisha Lewis
(74) *Attorney, Agent, or Firm* — Morgan, Lewis & Bockius LLP

(57) ABSTRACT

A gear train of an automatic transmission for vehicles has the advantages of simplifying structures of the automatic transmission and improving power delivery performance and fuel economy as a consequence of realizing at least nine forward speeds and one reverse speed by combining three simple planetary gear sets with four clutches and three brakes.

6 Claims, 3 Drawing Sheets

FIG. 2

|    | C1 | C2 | C3 | C4 | B1 | B2 | B3 | F1 |
|----|----|----|----|----|----|----|----|----|
| D1 | ●  |    |    |    | ●  | ●  |    | ○  |
| D2 |    | ●  |    |    | ●  | ●  |    |    |
| D3 | ●  | ●  |    |    | ●  |    |    |    |
| D4 | ●  | ●  |    |    |    |    | ●  |    |
| D5 |    | ●  | ●  | ●  |    |    | ●  |    |
| D6 |    | ●  |    | ●  |    |    | ●  |    |
| D7 |    |    | ●  | ●  |    |    | ●  |    |
| D8 | ●  |    |    | ●  | ●  |    | ●  |    |
| D9 | ●  |    |    | ●  |    |    |    |    |
| REV|    |    | ●  |    |    | ●  | ●  |    |

GEAR TRAIN OF AUTOMATIC TRANSMISSION FOR VEHICLES

CROSS-REFERENCE TO RELATED APPLICATION

This application claims priority to and the benefit of Korean Patent Application No. 10-2010-0113007 filed Nov. 12, 2010, the entire contents of which application is incorporated herein for all purposes by this reference.

BACKGROUND OF INVENTION

1. Field of Invention

The present invention relates to a gear train of an automatic transmission for vehicles which realizes at least nine forward speeds and one reverse speed by combining three simple planetary gear sets with four clutches and three brakes.

2. Description of Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

In such an automatic transmission, a gear train is realized by combining a plurality of planetary gear sets, and the gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a gear train of an automatic transmission for vehicles having advantages of simplifying structures of the automatic transmission and improving power delivery performance and fuel economy as a consequence of realizing at least nine forward speeds and one reverse speed by combining three simple planetary gear sets with four clutches and three brakes.

One aspect of the present invention is directed to a gear train of an automatic transmission for vehicles that may include a first rotation element having a first member of the first planetary gear set directly connected to an input shaft so as to be always operated as an input element, a second rotation element having a second member of the first planetary gear set forming a first intermediate output path through which a reduced rotation speed is output and operated as a selective fixed element, a third rotation element having a third member of the first planetary gear set forming a second intermediate output path through which an inverse rotation speed is output and operated as a selective fixed element, a fourth rotation element having a first member of the second planetary gear set connected selectively to the first and second intermediate output paths so as to form a first variable input path and operated as a selective fixed element, a fifth rotation element having a second member of the second planetary gear set and a first member of the third planetary gear set selectively connected to an input shaft so as to form a second variable input path and operated as a selective fixed element, a sixth rotation element having a second member of the third planetary gear set connected to an output gear so as to form a final output path, a seventh rotation element having a third member of the second planetary gear set and a third member of the third planetary gear set selectively connected to the input shaft so as to form a third variable input path, and friction members having a plurality of clutches selectively connecting each rotation element to the input shaft or another rotation element and a plurality of brakes selectively connecting each rotation element to a transmission housing.

The friction member may include first, second, third, and fourth clutches and first, second, and third brakes, wherein the first clutch selectively connects the third rotation element to the fourth rotation element, the second clutch selectively connects the input shaft to the seventh rotation element, the third clutch selectively connects the second rotation element to the fourth rotation element, the fourth clutch selectively connects the input shaft to the fifth rotation element, the first brake selectively connects the second rotation element to the transmission housing, the second brake selectively connects the fifth rotation element to the transmission housing, and the third brake selectively connects the third rotation element to the transmission housing.

The second brake may be provided with a one-way clutch disposed in parallel therewith.

The first clutch and the first and second brakes may be operated at a first forward speed, the second clutch and the first and second brakes may be operated at a second forward speed, the first and second clutches and the first brake may be operated at a third forward speed, the first and second clutches and the third brake may be operated at a fourth forward speed, the second and third clutches and the third brake may be operated at a fifth forward speed, the second and fourth clutches and the third brake may be operated at a sixth forward speed, the third and fourth clutches and the third brake may be operated at a seventh forward speed, the first and fourth clutches and the third brake may be operated at an eighth forward speed, the first and fourth clutches and the first brake may be operated at a ninth forward speed, the third clutch and the second and third brakes may be operated at a reverse speed.

The first member may be a first sun gear, the second member may be a first planet carrier, and the third member may be a first ring gear in the first planetary gear set.

The first member may be a second ring gear, the second member may be a second planet carrier, and the third member may be a second sun gear in the second planetary gear set.

The first member may be a third ring gear, the second member may be a third planet carrier, and the third member may be a third sun gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for an exemplary gear train according to the present invention.

DETAILED DESCRIPTION

Figure 1:
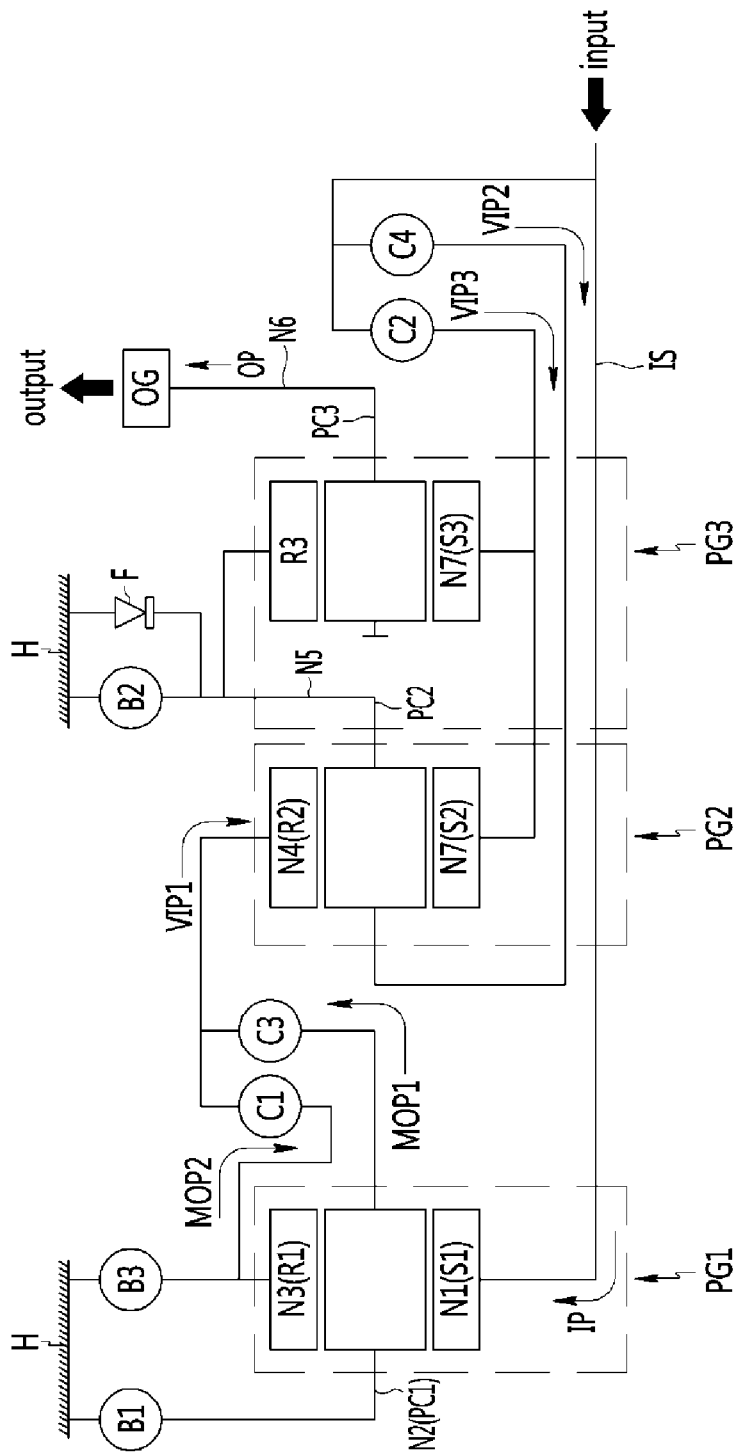
FIG. 1 is a schematic diagram of an exemplary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a gear train according to various embodiments of the present invention. A gear train according to various embodiments of the present invention includes first, second, and third planetary gear sets PG1, PG2, and PG3 disposed on the same axis, clutch means consisting of four clutches C1, C2, C3, and C4, and brake means consisting of three brakes B1, B2, and B3.

A rotation speed input from the input shaft IS is changed by the first, second, and third planetary gear sets PG1, PG2, and PG3 and is output through the output gear OG. At this time, the first planetary gear set PG1 is disposed at the rearmost, and the second and third planetary gear sets PG2 and PG3 are sequentially dispose to the front.

The input shaft IS is an input member and denotes a turbine shaft of a torque converter. Torque transmitted from a crankshaft of the engine is converted by the torque converter and is input to the gear train through the input shaft IS. The output shaft OS is an output member and is connected to a well-known differential apparatus so as to transmit an output of the gear train to driving wheels.

The first planetary gear set PG1 is a single pinion planetary gear set, and includes three rotation elements consisting of a sun gear, a planet carrier, and a ring gear. For better comprehension and ease of description, the sun gear is indicated by the first sun gear S1, the planet carrier is indicated by the first planet carrier PC1, and the ring gear is indicated by the first ring gear R1.

The first sun gear S1 is directly connected to the input shaft IS so as to be operated as a first rotation element N1 forming an input path IP, the first planet carrier PC1 is selectively connected to a transmission housing H and is operated as a second rotation element N2 forming a first intermediate output path MOP1, and the first ring gear R1 is selectively connected to the transmission housing H and is operated as a third rotation element N3 forming a second intermediate output path MOP2.

Accordingly, in a state that a rotation speed of the input shaft IS is always input to the first rotation element N1, an inverse rotation speed is output through the second intermediate output path MOP2 if the second rotation element N2 is operated as a fixed element, and a reduced rotation speed is output through the first intermediate output path MOP1 if the third rotation element N3 is operated as a fixed element.

That is, the first planetary gear set PG1 selectively outputs the reduced rotation speed and the inverse rotation speed.

The second planetary gear set PG2 is a single pinion planetary gear set and includes three rotation elements consisting of a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

The third planetary gear set PG3 is a single pinion planetary gear set and includes three rotation elements consisting of a sun gear, a planet carrier, and a ring gear. For better comprehension and ease of description, the sun gear is indicated by a third sun gear S3, the planet carrier is indicated by a third planet carrier PC3, and the ring gear is indicated by a third ring gear R3.

The second sun gear S2 is directly connected to the third sun gear S3 and the second planet carrier PC2 is directly connected to the third ring gear R3 such that the second and third planetary gear sets PG2 and PG3 forms one compound planetary gear set and includes four rotation elements.

Accordingly, the second ring gear R2 is operated as a fourth rotation element N4, the second planet carrier PC2 and the third ring gear R3 are operated as a fifth rotation element N5, the third planet carrier PC3 is operated as a sixth rotation element N6, and the second and third sun gears S2 and S3 are operated as a seventh rotation element N7.

In addition, the second ring gear R2 of the fourth rotation element N4 is selectively connected to the first intermediate output path MOP1 of the second rotation element N2 and to the second intermediate output path MOP2 of the third rotation element N3 so as to form a first variable input path VIP1 selectively receiving the reduced rotation speed and the inverse rotation speed.

The second planet carrier PC2 and the third ring gear R3 of the fifth rotation element N5 are selectively connected to the input shaft IS so as to form a second variable input path VIP2 and are selectively connected to the transmission housing H so as to be operated as a selective fixed element.

The third planet carrier PC3 of the sixth rotation element N6 is directly connected to the output gear OG which is an output member so as to form a final output path OP.

The second and third sun gears S2 and S3 of the seventh rotation element N7 are selectively connected to the input shaft IS so as to form a third variable input path VIP3.

Friction members such as first, second, third, and fourth clutches C1, C2, C3, and C4 and first, second, and third brakes B1, B2, and B3 are used for connection between the rotation elements, connection between each rotation element and the input shaft IS, and connection between each rotation element and the transmission housing H.

The first clutch C1 is disposed between the third rotation element N3 and the fourth rotation element N4, the second clutch C2 is disposed between the input shaft IS and the seventh rotation element N7, the third clutch C3 is disposed between the second rotation element N2 and the fourth rotation element N4, the fourth clutch C4 is disposed between the input shaft IS and the fifth rotation element N5, the first brake B1 is disposed between the second rotation element N2 and the transmission housing H, the second brake B2 is disposed between the fifth rotation element N5 and the transmission housing H, and the third brake B3 is disposed between the third rotation element N3 and the transmission housing H.

In addition, the second brake B2 and a one-way clutch F1 are disposed in parallel according to various embodiments of the present invention. Since the one-way clutch F1 is operated instead of the second brake B2 at a normal first forward speed D1, shift shock may be prevented when upshift to a second forward speed D2.

If the one-way clutch F1 is omitted, the second brake B2 must be operated at the first forward speed D1.

The first and third brakes B1 and B3 are disposed at an external circumferential portion of the first planetary gear set PG1, the first and third clutches C1 and C3 are disposed between the first and second planetary gear sets PG1 and PG2, the second brake B2 including the one-way clutch F1 is disposed at an external circumferential portion of the second planetary gear set PG2 or between the second and third planetary gear sets PG2 and PG3, and the second and fourth clutches C2 and C4 are disposed at a front portion of the third planetary gear set PG3.

If the friction members are dispersed as described above, formation of hydraulic lines for supplying hydraulic pressure to such friction members may be simplified, and weight balance in the automatic transmission may be enhanced.

Friction members consisting of the first, second, third, and fourth clutches C1, C2, C3, and C4 and the first, second, and third brakes B1, B2, and B3 are conventional multi-plate friction elements of wet type that are operated by hydraulic pressure.

Figure 2:
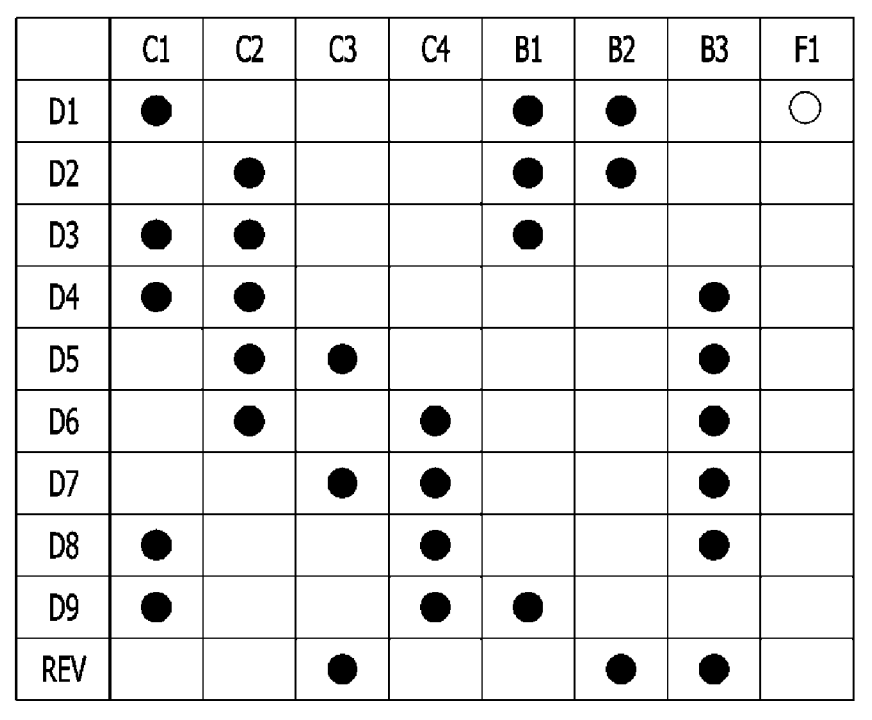

FIG. 2 is an operational chart for a gear according to various embodiments of the present invention.

According to various embodiments of the present invention, three friction members are operated at each shift-speed.

That is, the first clutch C1 and the first and second brakes B1 and B2 are operated at the first forward speed D1, the second clutch C2 and the first and second brakes B1 and B2 are operated at the second forward speed D2, the first and second clutches C1 and C2 and the first brake B1 are operated at a third forward speed D3, the first and second clutches C1 and C2 and the third brake B3 are operated at a fourth forward speed D4, the second and third clutches C2 and C3 and the third brake B3 are operated at a fifth forward speed D5, the second and fourth clutches C2 and C4 and the third brake B3 are operated at a sixth forward speed D6, the third and fourth clutches C3 and C4 and the third brake B3 are operated at a seventh forward speed D7, the first and fourth clutches C1 and C4 and the third brake B3 are operated at an eighth forward speed D8, the first and fourth clutches C1 and C4 and the first brake B1 are operated at a ninth forward speed D9, and the third clutch C3 and the second and third brakes B2 and B3 are operated at a reverse speed REV.

At the first and second forward speeds D1 and D2, the one-way clutch F1 may be operated instead of the second brake B2. The second brake B2 is not operated at a normal forward driving, and the second brake B2 is operated at L and 2 ranges at which large driving torque is necessary.

Figure 3:
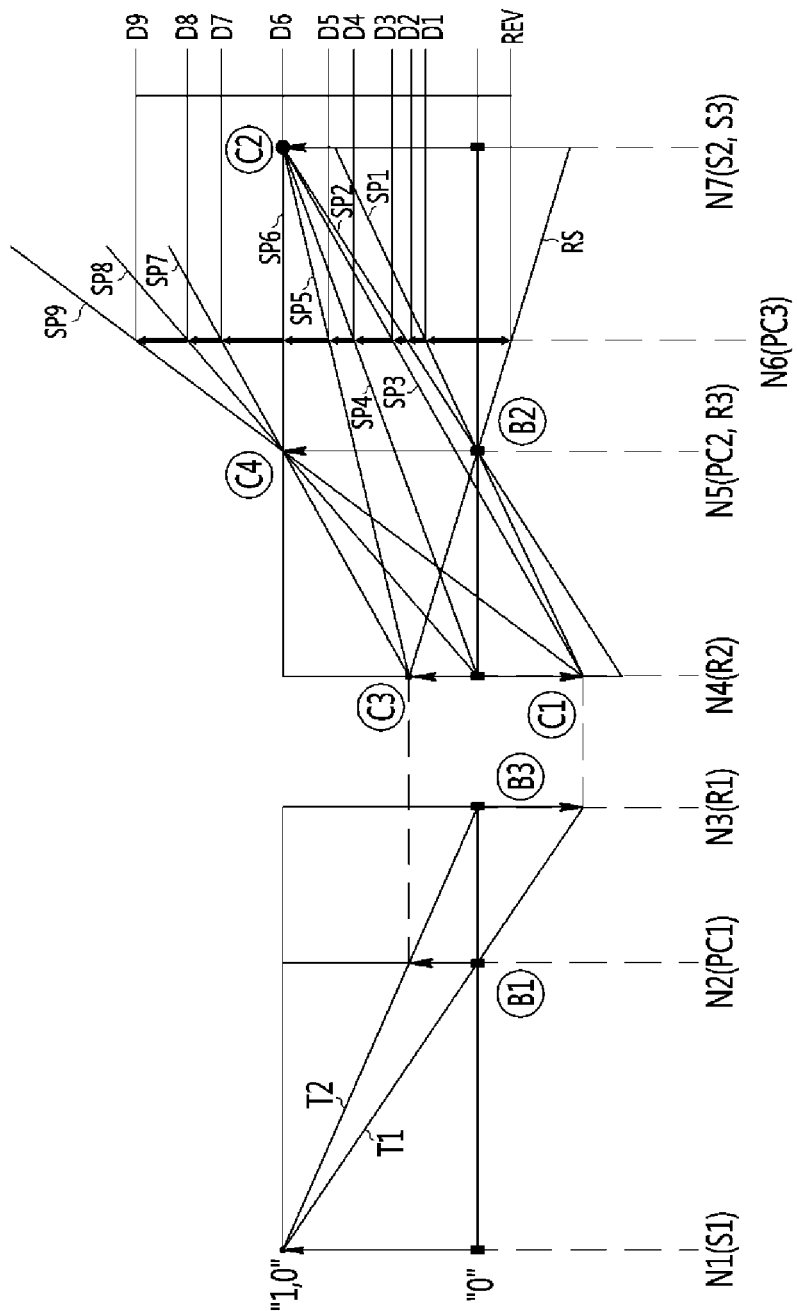
FIG. 3 is a lever diagram for an exemplary gear train according to the present invention.

FIG. 3 is a lever diagram for a gear train according to various embodiments of the present invention. In the drawings, a lower horizontal line represents a rotational speed is "0", and an upper horizontal line represents a rotational speed is "1.0", that is, the rotational speed thereof is the same as that of the input shaft IS.

Three vertical lines of the first planetary gear set PG1 sequentially represent the first sun gear S1 being the first rotation element N1, the first planet carrier PC1 being the second rotation element N2, and the first ring gear R3 being the third rotation element N3 from the left to the right, and distances therebetween are set according to a gear ratio (teeth number of the sun gear/teeth number of the ring gear) of the first planetary gear set PG1.

Four vertical lines of the second and third planetary gear sets PG2 and PG3 sequentially represent the second ring gear R2 being the fourth rotation element N4, the second planet carrier PC2 and the third ring gear R3 being the fifth rotation element N5, the third planet carrier PC3 being the sixth rotation element N6, the second and third sun gears S2 and S3 being the seventh rotation element N7, and distances therebetween are set according to gear ratios (teeth number of the sun gear/teeth number of the ring gear) of the second and third planetary gear sets PG2 and PG3.

Position of each rotation element in the lever diagram is well known to a person of an ordinary skill in the art who designs a gear train, and thus detailed description will be omitted.

First Forward Speed

As shown in FIG. 2, the first clutch C1 and the first and second brakes B1 and B2 are operated at the first forward speed D1.

Accordingly, in a state that the rotation speed of the input shaft IS is input to the first rotation element N1 forming the input path IP, the second rotation element N2 is operated as the fixed element by operation of the first brake B1. Therefore, the rotation elements of the first planetary gear set PG1 form a first forward speed line T1 and the inverse rotation speed is output through the third rotation element N3 forming the second intermediate output path MOP2.

The inverse rotation speed of the second intermediate output path MOP2 is input to the fourth rotation element N4 through the first intermediate input path VIP1 by operation of the first clutch C1, and the fifth rotation element N5 is operated as the fixed element by operation of the second brake B2. Therefore, the rotation elements of the second and third planetary gear sets PG2 and PG3 form a first shift line SP1, and the first shift line SP1 crosses the vertical line of the sixth rotation element N6 that is the output element so as to output the first forward speed D1.

Second Forward Speed

The first clutch C1 which was operated at the first forward speed D1 is released and the second clutch C2 is operated at the second forward speed D2.

The rotation speed of the input shaft IS is input to the seventh rotation element N7 through the third variable input path VIP3 by operation of the second clutch C2, and the fifth rotation element N5 is operated as the fixed element by operation of the second brake B2. Therefore, the rotation elements of the second and third planetary gear sets PG2 and PG3 form a second shift line SP2, and the second shift line SP2 crosses the vertical line of the sixth rotation element N6 that is the output element so as to output the second forward speed D2.

At this time, the rotation speed of the input shaft IS is input to the first planetary gear set PG1 through the input path IP, but it does not affect on shifting because the first and third clutches C1 and C3 connected to the second and third planetary gear sets PG2 and PG3 are not operated.

In addition, it is exemplified that the second brake B2 is operated at the first and second forward speeds D1 and D2, but the one-way clutch F1 performs function of the second brake B2 even though the second brake B2 is not operated. If the one-way clutch F1 is operated at the second forward speed D2, shift feel may be improved when upshift to the third forward speed D3.

Third Forward Speed

As shown in FIG. 2, the second brake B2 which was operated at the second forward speed D2 is released and the first clutch C1 is operated at the third forward speed D3.

Accordingly, in a state that the rotation speed of the input shaft IS is input to the first rotation element N1 forming the input path IP, the second rotation element N2 is operated as the fixed element by operation of the first brake B1 such that the rotation elements of the first planetary gear set PG1 form the first forward speed line T1. Therefore, the inverse rotation speed is output through the third rotation element N3 forming the second intermediate output path MOP2.

At this state, the rotation speed of the input shaft IS is input to the seventh rotation element N7 through the third variable input path VIP3 by operation of the second clutch C2 and the inverse rotation speed is input to the fourth rotation element N3 by operation of the first clutch C1. Therefore, the rotation elements of the second and third planetary gear sets PG2 and PG3 form a third shift line SP3, and the third shift line SP3 crosses the vertical line of the sixth rotation element N6 that is the output element so as to output the third forward speed D3.

Fourth Forward Speed

As shown in FIG. 2, the first brake B1 which was operated at the third forward speed D3 is released and the third brake B3 is operated at the fourth forward speed D4.

Accordingly, in a state that the rotation speed of the input shaft IS is input to the first rotation element N1 forming the input path IP, the third rotation element N3 is operated as the fixed element by operation of the third brake B3. Therefore, the rotation elements of the first planetary gear set PG1 form a second forward speed line T2 and the fourth rotation element N4 is operated as the fixed element by operation of the first clutch C1.

At this state, the rotation speed of the input shaft IS is input to the seventh rotation element N7 through the third variable input path VIP3 by operation of the second clutch C2. Therefore, the rotation elements of the second and third planetary gear sets PG2 and PG3 form a fourth shift line SP4, and the fourth shift line SP4 crosses the vertical line of the sixth rotation element N6 that is the output element so as to output the fourth forward speed D4.

Fifth Forward Speed

As shown in FIG. 2, the first clutch C1 which was operated at the fourth forward speed D4 is released and the third clutch C3 is operated at the fifth forward speed D5.

Accordingly, in a state that the rotation speed of the input shaft IS is input to the first rotation element N1 forming the input path IP, the third rotation element N3 is operated as the fixed element by operation of the third brake B3. Therefore, the rotation elements of the first planetary gear set PG1 form the second forward speed line T2 and the reduced rotation speed is output through the first intermediate output path MOP1 of the second rotation element N2.

At this state, the reduced rotation speed is input to the fourth rotation element N4 through the first variable input path VIP1 by operation of the third clutch C3, and the rotation speed of the input shaft IS is input to the seventh rotation element N7 through the third variable input path VIP3 by operation of the second clutch C2. Therefore, the rotation elements of the second and third planetary gear sets PG2 and PG3 form a fifth shift line SP5, and the fifth shift line SP5 crosses the vertical line of the sixth rotation element N6 that is the output element so as to output the fifth forward speed D5.

Sixth Forward Speed

As shown in FIG. 2, the third clutch C3 which was operated at the fifth forward speed D5 is released and the fourth clutch C4 is operated at the sixth forward speed D6.

Accordingly, the rotation speed of the input shaft IS is input to the fifth rotation element N5 and the seventh rotation element N7 through the third and fourth variable input paths VIP3 and VIP4 by operation of the second and fourth clutches C2 and C4 respectively, and the second and third planetary gear sets PG2 and PG3 become direct-coupling state. Therefore, the rotation elements of the second and third planetary gear sets PG2 and PG3 form a sixth shift line SP6, and the sixth shift line SP6 crosses the vertical line of the sixth rotation element N6 that is the output element so as to output the sixth forward speed D6.

At this time, the rotation speed of the input shaft IS is input to the first planetary gear set PG1 through the input path IP and the reduced rotation speed is output through the first intermediate output path MOP1 by operation of the third brake B3. However, it does not affect on shifting because the third clutch C3 is not operated.

Seventh Forward Speed

As shown in FIG. 2, the second clutch C2 which was operated at the sixth forward speed D6 is released and the third clutch C3 is operated at the seventh forward speed D7.

Accordingly, in a state that the rotation speed of the input shaft IS is input to the first rotation element N1 forming the input path IP, the third rotation element N3 is operated as the fixed element by operation of the third brake B3. Therefore, the rotation elements of the first planetary gear set PG1 form the second forward speed line T2 and the reduced rotation speed is output through the first intermediate output path MOP1 of the second rotation element N2.

At this state, the reduced rotation speed is input to the fourth rotation element N4 through the first variable input path VIP1 by operation of the third clutch C3, and the rotation speed of the input shaft IS is input to the fifth rotation element N5 through the second variable input path VIP2 by operation of the fourth clutch C4. Therefore, the rotation elements of the second and third planetary gear sets PG2 and PG3 form a seventh shift line SP7, and the seventh shift line SP7 crosses the vertical line of the sixth rotation element N6 that is the output element so as to output the seventh forward speed D7.

Eighth Forward Speed

As shown in FIG. 2, the third clutch C3 which was operated at the seventh forward speed D7 is released and the first clutch C1 is operated at the eighth forward speed D8.

Accordingly, in a state that the rotation speed of the input shaft IS is input to the first rotation element N1 forming the input path IP, the third rotation element N3 is operated as the fixed element by operation of the third brake B3. Therefore, the rotation elements of the first planetary gear set PG1 form the second forward speed line T2 and the fourth rotation element N4 is operated as the fixed element by operation of the first clutch C1.

At this state, the rotation speed of the input shaft IS is input to the fifth rotation element N5 through the second variable input path VIP2 by operation of the fourth clutch C4. Therefore, the rotation elements of the second and third planetary gear sets PG2 and PG3 form an eighth shift line SP8, and the eighth shift line SP8 crosses the vertical line of the sixth rotation element N6 that is the output element so as to output the eighth forward speed D8.

Ninth Forward Speed

As shown in FIG. 2, the third brake B3 which was operated at the eighth forward speed D8 is released and the first brake B1 is operated at the ninth forward speed D9.

Accordingly, in a state that the rotation speed of the input shaft IS is input to the first rotation element N1 forming the input path IP, the second rotation element N2 is operated as the fixed element by operation of the first brake B1. Therefore, the rotation elements of the first planetary gear set PG1 form the first forward speed line T1 and the inverse rotation speed is output through the third rotation element N3 forming the second intermediate output path MOP2.

The inverse rotation speed of the second intermediate output path MOP2 is input to the fourth rotation element N4 through the first intermediate input path VIP1 by operation of the first clutch C1, and the rotation speed of the input shaft IS is input to the fifth rotation element N5 by operation of the fourth clutch C4. Therefore, the rotation elements of the second and third planetary gear sets PG2 and PG3 form a ninth shift line SP9, and the ninth shift line SP9 crosses the vertical line of the sixth rotation element N6 that is the output element so as to output the ninth forward speed D9.

Reverse Speed

As shown in FIG. 2, the third clutch C3 and the second and third brakes B2 and B3 are operated at the reverse speed REV.

Accordingly, in a state that the rotation speed of the input shaft IS is input to the first rotation element N1 forming the input path IP, the third rotation element N3 is operated as the fixed element by operation of the third brake B3. Therefore, the rotation elements of the first planetary gear set PG1 form the second forward speed line T2 and the reduced rotation speed is output through the first intermediate output path MOP1 of the second rotation element N2.

In a state that the reduced rotation speed is input to the fourth rotation element N4 through the first variable input path VIP1 by operation of the third clutch C3, the fifth rotation element N5 is operated as the fixed element by operation of the second brake B2. Therefore, the rotation elements of the second and third planetary gear sets PG2 and PG3 form a reverse shift line RS, and the reverse shift line RS crosses the vertical line of the sixth rotation element N6 that is the output element so as to output the reverse speed REV.

As described above, nine forward speeds and one reverse speed are achieved by combining three simple planetary gear sets with four clutches and three brakes and operating three frictional elements at each shift-speed. Therefore, power delivery performance and fuel economy may be improved.

Since the friction members including a plurality of clutches and brakes are dispersedly disposed, formation of hydraulic lines for supplying hydraulic pressure thereto may be simplified and weight balance in an automatic transmission may be enhanced.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles provided with first, second, and third planetary gear sets, each respectively having three members, the gear train comprising:
   a first rotation element having a first member of the first planetary gear set directly connected to an input shaft so as to be always operated as an input element;
   a second rotation element having a second member of the first planetary gear set forming a first intermediate output path through which a reduced rotation speed is output and operated as a selective fixed element;
   a third rotation element having a third member of the first planetary gear set forming a second intermediate output path through which an inverse rotation speed is output and operated as a selective fixed element;
   a fourth rotation element having a first member of the second planetary gear set connected selectively to the first and second intermediate output paths so as to form a first variable input path;
   a fifth rotation element having a second member of the second planetary gear set and a first member of the third planetary gear set selectively connected to an input shaft so as to form a second variable input path and operated as a selective fixed element;
   a sixth rotation element having a second member of the third planetary gear set connected to an output gear so as to form a final output path;
   a seventh rotation element having a third member of the second planetary gear set and a third member of the third planetary gear set selectively connected to the input shaft so as to form a third variable input path; and
   friction members having a plurality of clutches selectively connecting each rotation element to the input shaft or another rotation element and a plurality of brakes selectively connecting each rotation element to a transmission housing.

2. The gear train of claim 1, wherein the first, second, and third planetary gear sets are single or double pinion planetary gear sets.

3. The gear train of claim 1, wherein the friction member comprises first, second, third, and fourth clutches and first, second, and third brakes; and
   wherein the first clutch selectively connects the third rotation element to the fourth rotation element, the second clutch selectively connects the input shaft to the seventh rotation element, the third clutch selectively connects the second rotation element to the fourth rotation element, the fourth clutch selectively connects the input shaft to the fifth rotation element, the first brake selectively connects the second rotation element to the transmission housing, the second brake selectively connects the fifth rotation element to the transmission housing, and the third brake selectively connects the third rotation element to the transmission housing.

4. The gear train of claim 3, wherein the second brake is provided with a one-way clutch disposed in parallel therewith.

5. The gear train of claim 3, wherein the first clutch and the first and second brakes are operated at a first forward speed;
the second clutch and the first and second brakes are operated at a second forward speed;
the first and second clutches and the first brake are operated at a third forward speed;
the first and second clutches and the third brake are operated at a fourth forward speed;
the second and third clutches and the third brake are operated at a fifth forward speed;
the second and fourth clutches and the third brake are operated at a sixth forward speed;
the third and fourth clutches and the third brake are operated at a seventh forward speed;
the first and fourth clutches and the third brake are operated at an eighth forward speed;
the first and fourth clutches and the first brake are operated at a ninth forward speed; and
the third clutch and the second and third brakes are operated at a reverse speed.

6. The gear train of claim 1, wherein the first member is a first sun gear, the second member is a first planet carrier, and the third member is a first ring gear in the first planetary gear set;
the first member is a second ring gear, the second member is a second planet carrier, and the third member is a second sun gear in the second planetary gear set; and
the first member is a third ring gear, the second member is a third planet carrier, and the third member is a third sun gear.

* * * * *